United States Patent [19]

Valo

[11] 3,960,267

[45] June 1, 1976

[54] TURNING DEVICE FOR LOGS AND SIMILAR

[76] Inventor: Antti Tapani Valo, Lohja 10, Finland

[22] Filed: Oct. 3, 1974

[21] Appl. No.: 511,815

[30] Foreign Application Priority Data
Sept. 18, 1974 Finland .............. 2721/74

[52] U.S. Cl. .............. 198/278; 198/268
[51] Int. Cl.² .............. B65G 47/24
[58] Field of Search .......... 198/246, 251, 254, 262, 198/266, 267, 268, 272, 278, 280, 282, 284, 281; 214/1 P, 1 PB, 1 QG

[56] References Cited
UNITED STATES PATENTS

| | | | |
|---|---|---|---|
| 602,375 | 4/1898 | Suydam, Sr. | 198/45 X |
| 2,162,457 | 6/1939 | Laxo | 198/282 |
| 2,840,220 | 6/1958 | Antonelli | 198/282 X |
| 2,985,276 | 5/1961 | Uderstadt | 198/272 X |
| 3,209,889 | 10/1965 | Metzger | 198/262 X |
| 3,265,184 | 8/1966 | Franciosi | 198/262 X |
| 3,276,566 | 10/1966 | Raasch | 198/262 |
| 3,289,808 | 12/1966 | Simmons | 198/262 X |
| 3,389,777 | 6/1968 | Rysti | 198/262 |
| 3,656,656 | 4/1972 | Maiaro | 198/262 X |
| 3,805,969 | 4/1974 | Bilocq | 198/237 X |
| 3,811,550 | 5/1974 | Ajero | 198/272 |
| 3,874,498 | 4/1975 | Cover et al. | 198/279 X |

FOREIGN PATENTS OR APPLICATIONS

| | | | |
|---|---|---|---|
| 218,534 | 5/1967 | Sweden | 198/107 |
| 210,890 | 11/1966 | Sweden | 214/1 P |

*Primary Examiner*—John J. Love
*Assistant Examiner*—Richard K. Thomson
*Attorney, Agent, or Firm*—Ladas, Parry, Von Gehr, Goldsmith & Deschamps

[57] ABSTRACT

A device for moving logs from a first longitudinal conveyor onto a crossing second conveyor and for turning the logs the desired end first on said second conveyor. The device comprises two side walls positioned at each side of said second conveyor, said side walls forming each two oppositely facing sliding surfaces inclined in the longitudinal direction of said second conveyor. Each side wall is provided with a guiding means, said guiding means being pivotable in opposite directions for guiding each log selectively upon two oppositely facing sliding surfaces of said side walls to cause the log to turn in the desired direction while sliding along said sliding surfaces onto said second conveyor.

6 Claims, 6 Drawing Figures

TURNING DEVICE FOR LOGS AND SIMILAR

The present invention relates to a device for moving logs from a first longitudinal conveyor to a second longitudinal conveyor positioned underneath and transversely to said first conveyor, and for turning the logs the desired end first upon said second conveyor.

When handling logs it is often desirable that the logs are guided either the butt end or the top end first into the handling machine, such as a saw, a debarking machine or similar. Since the butt and top ends of logs transported longitudinally on conveyors to the handling point are usually placed quite at random with respect to the direction of transport, logs carried the wrong end first must be turned.

It is previously known to use for the turning of logs various mechanical means, such as turning tables, turning grabs, conveyor chains and similar, by means of which the logs are turned in the desired direction by mechanically transferring, turning, pushing and/or pulling them. Such mechanical turning devices, however, turn out complicated and expensive as to their construction, since they require motor-driven devices, power transmission means etc. The use of numerous moving parts furthermore makes the turning device more susceptible to functional disturbances.

The object of the present invention is to provide a turning device which eliminates the above disadvantages, and this is achieved with a turning device according to the invention which comprises two side walls arranged at said second conveyor underneath said first conveyor which side walls together with said second conveyor form a channel, each said side wall forming oppositely facing downwardly inclined sliding surfaces, and further comprising turnable guiding means arranged above said side walls for guiding a log received said first conveyor selectively along two oppositely facing sliding surfaces of said side walls to said second conveyor and turning the desired end of said log into the transport direction of said second conveyor.

In the turning device according to the invention the log's own weight is utilized as far as possible for performing the turning operation, whereby the log itself turns in the desired position when sliding along the appropriately arranged fixed guides. The only moving parts of the turning device may in the simplest embodiment be limited solely to two pivotable plates so that the turning device turns out very simple and reliable with respect to its construction and function.

The invention will be described in more detail below with reference to the enclosed drawings in which.

Figure 1:
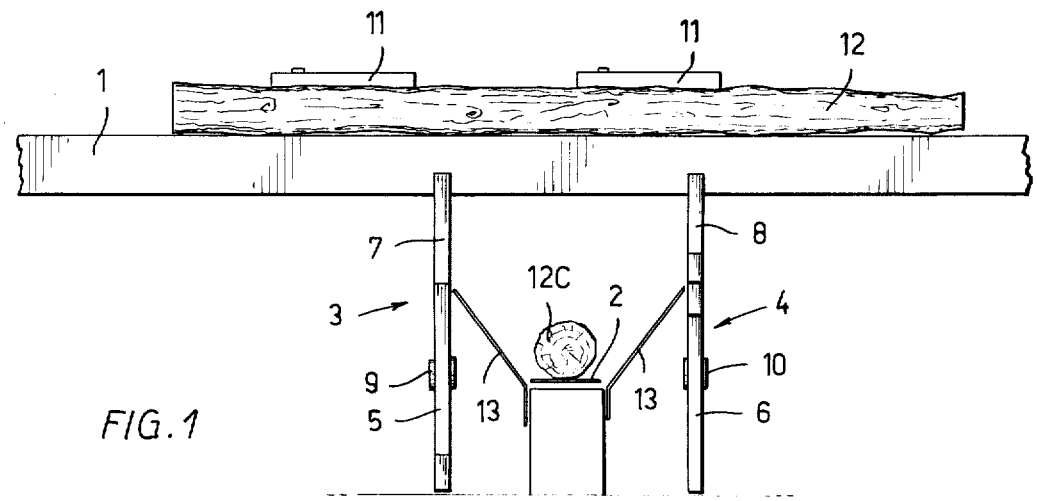
FIG. 1 is a side-view of a preferred embodiment of a turning device according to the invention seen in the longitudinal direction of the second conveyor.

The turning device illustrated in the drawing comprises a first conveyor 1 transporting logs longitudinally and a second conveyor 2 arranged underneath the first conveyor, perpendicularly thereto, likewise transporting logs longitudinally. Underneath the first or upper conveyor on opposite sides of the second or lower conveyor, vertical guides 3, 4 are arranged, each comprising guide plates 5, 6 extending above the plane of the lower conveyor and upwardly extending guiding peaks 7, 8. The upper edges of the guide plates 5, 6 form in opposite directions of the conveyor 2 inclined sliding surfaces 5a, 5b and 6a, 6b respectively and the guiding peaks are positioned at points of intersection of the sliding surfaces.

Figure 2:
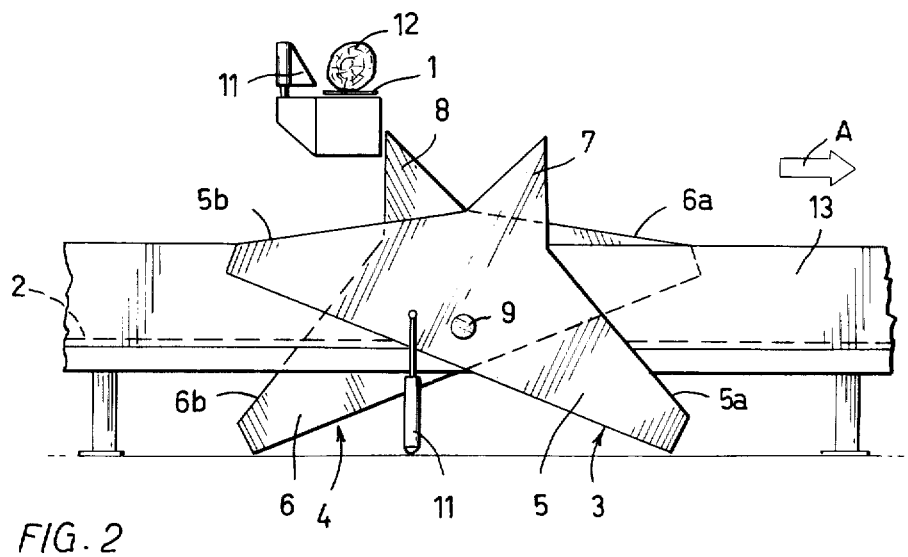
FIG. 2 is a side-view of the device seen in the longitudinal direction of the first conveyor.

The guide plates 5, 6 are pivotably mounted by means of bearings on co-axial pivot shafts 9, 10, the supports of which are not shown in the Figures of the drawings. The guides are pivotable on said shafts by means of hydraulic cylinders 11 in opposite directions so that when the guiding peak (e.g. 7) of one guide (3 respectively) is tilted in the transport direction A of the conveyor 2, the guiding peak 8 of the other guide 4 is tilted in the opposite direction, as shown in FIG. 2.

Kicking devices 11 known per se are provided at the first conveyor 1 in order to push the log 12 off from the conveyor.

The turning device operates in the following manner: When the first conveyor 1 transports a log 12 towards the conveyor 2 the log passes a device known per se which e.g. by means of photoelectric cells is capable of defining whether the log is transported with the butt end or the top end first. If assumed that the log moves along the first conveyor with the butt end first and that it is desired that the log moves along the second conveyor 2 still with the butt end first, said device sends the pivoting means 11 of the guides 3, 4 such an impulse as will cause the guides to be pivoted into the positions shown in FIGS. 1 and 2. If the guides are already so positioned, it is evident that no pivoting occurs.

When the log has advanced approximately half way over the conveyor 2 the kicking devices 11 receive an impulse, e.g. as the front end of the log passes a suitable photoelectric cell, whereby the kicking devices push the log off from the conveyor 1. The log thus falls onto the guides 3, 4 in the position 12A, whereby the guiding peak 7 guides the top end of the log onto the sliding surface 5b of the guide plate 5 and the guiding peak 8 guides the butt end of the log onto the sliding surface 6a of the guide plate 6 in the position 12B. The log slides downwardly along said sliding surfaces onto the conveyor 2 moving between the guides at the same time turning into the direction of the conveyor so that the log is disposed on the conveyor with the butt end first in the position 12C.

If the log 12 is transported on the conveyor 1 with the top end first said device sends the pivot means 11 of the guides 3, 4 a corresponding impulse whereby the guides are pivoted into positions opposite to those in FIGS. 1 and 2. Thus the guiding peak 7 guides the butt end of the log onto the sliding surface 5a of the guide plate 5 and the guiding peak 8 guides the top end of the log onto the sliding surface 6b of the guide plate 6 so that also this log will be caused to turned while sliding down along said sliding surfaces into such a position as to place the butt end first on the conveyor 2. 30

Figure 6:
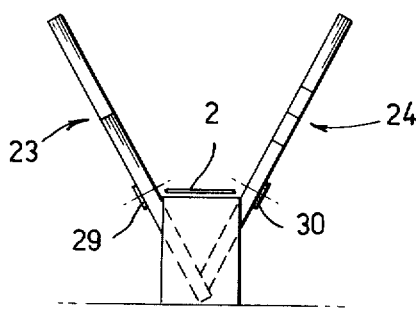
FIG. 6 shows an alternative embodiment of the device seen in the longitudinal direction of the second conveyor.
Figure 3:
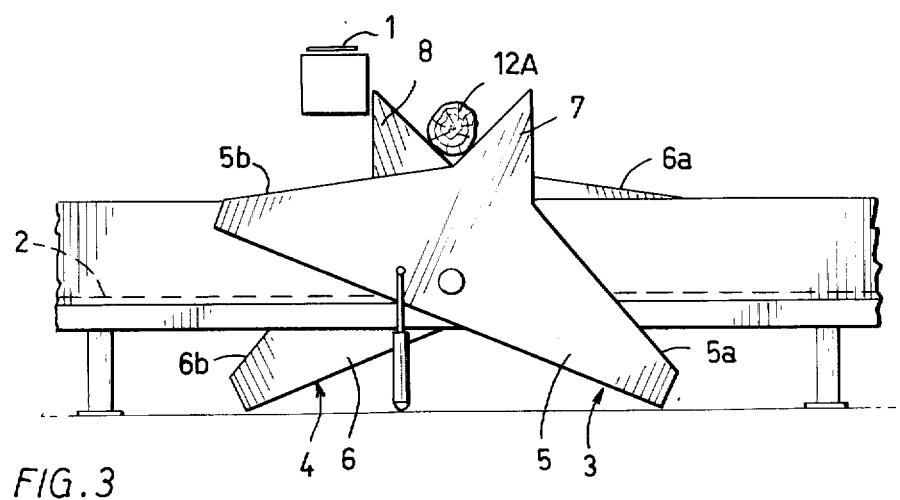
FIGS. 3 to 5 show each a different turning phase during the operation of the device.
Figure 4:
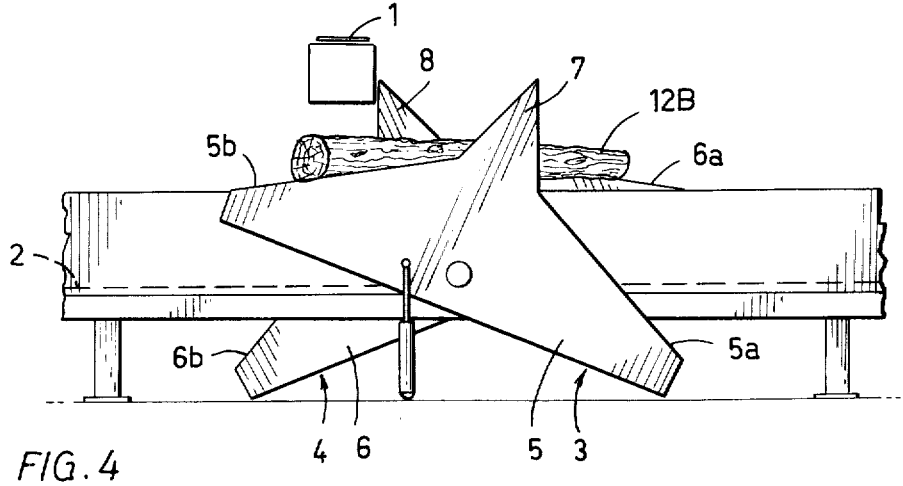
Figure 5:
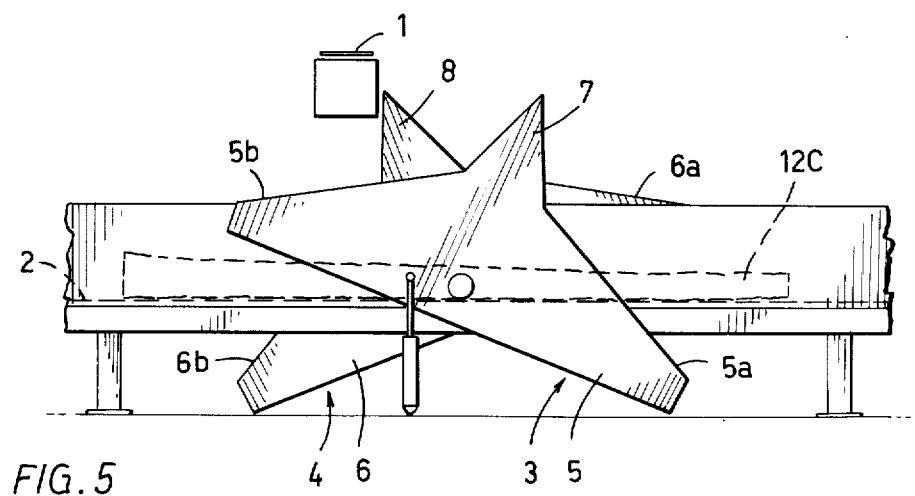

In the embodiment described above, the conveyor 2 is provided with downward-inwardly inclined side walls 13 which contribute in the guiding of the log onto the conveyor 2. When the turning device according to the invention is used in connection with a conveyor which normally does not employ such side walls, as illustrated in FIG. 6, the guides 23, 24 can be mounted on pivot shafts 29, 30 which form an angle with each other. Thereby the two guides and the conveyor 2 together form a channel in which the guides themselves form side walls which ensure the correct sliding of the logs down to the conveyor.

The drawings and the corresponding specification are only intended to illustrate the invention. In its details the turning device according to the invention may vary even considerably within the scope of the claims.

Thus it is possible to form said inclined sliding surfaces fixedly on the above mentioned side walls 13 of the conveyor 2 and to mount pivotable flaps at the points of intersection of the inclined sliding surfaces of both side walls, said flaps acting as said guiding peaks. The guiding flaps are thus pivotable with respect to the fixed sliding surfaces optionally in opposite directions.

What I claim is:

1. Apparatus for transporting logs, comprising a first longitudinal conveyor, a second longitudinal conveyor positioned underneath and transversely to said first conveyor, and transfer means for receiving a log displaced transversely from the first conveyor and transferring it onto said second conveyor, said transfer means comprising:

means at each side of the second conveyor defining two inclined surfaces which slope downwardly away from each other in opposite directions along the second conveyor; and a guide member at each side of the second conveyor extending above the inclined surfaces and pivotable towards and away from the first conveyor about an axis which extends transversely to said second conveyor, whereby when one of said guide members is pivoted towards said first conveyor and the other guide member is pivoted away from said first conveyor a log that is displaced from the first conveyor and is received by the transfer means is guided by the guide members so that a first region of the log engages that inclined surface on one side of the second conveyor which slopes in the direction of movement of the second conveyor and a second region of the log engages that inclined surface on the other side of the conveyor which slopes in the opposite direction, and the log slides down the inclined surfaces which it engages and is finally received on the second conveyor with said first region of the log leading the second region of the log in the direction of movement of the second conveyor.

2. Apparatus as claimed in claim 1, in which said means at each side of the second conveyor comprise first and second plate members mounted at opposite sides respectively of the second conveyor.

3. Apparatus as claimed in claim 2, in which each plate member is integral with the guide member mounted at that side of the second conveyor.

4. Apparatus as claimed in claim 3, wherein the axes about which the guide members pivot extend obliquely with respect to each other and the plate members extend downwardly and inwardly to form a channel with the second conveyor.

5. Apparatus as claimed in claim 1, further comprising two side walls arranged at opposite sides of the second conveyor between said means at each side of the second conveyor, the two side walls cooperating with said second conveyor to form a channel.

6. Apparatus as claimed in claim 1, wherein the guide members are pivotably mounted on coaxial shafts.

* * * * *